May 2, 1961

V. W. DAKIN 2,982,067

PACKAGING MACHINE

Filed June 23, 1958

INVENTOR.
Vernon W. Dakin
BY
L. P. Buret
ATTORNEY

May 2, 1961 V. W. DAKIN 2,982,067
PACKAGING MACHINE

Filed June 23, 1958 5 Sheets-Sheet 2

INVENTOR.
Vernon W. Dakin
BY
L. D. Burch
ATTORNEY

May 2, 1961 V. W. DAKIN 2,982,067
PACKAGING MACHINE
Filed June 23, 1958 5 Sheets-Sheet 3

INVENTOR.
Vernon W. Dakin
BY
L.D. Burch
ATTORNEY

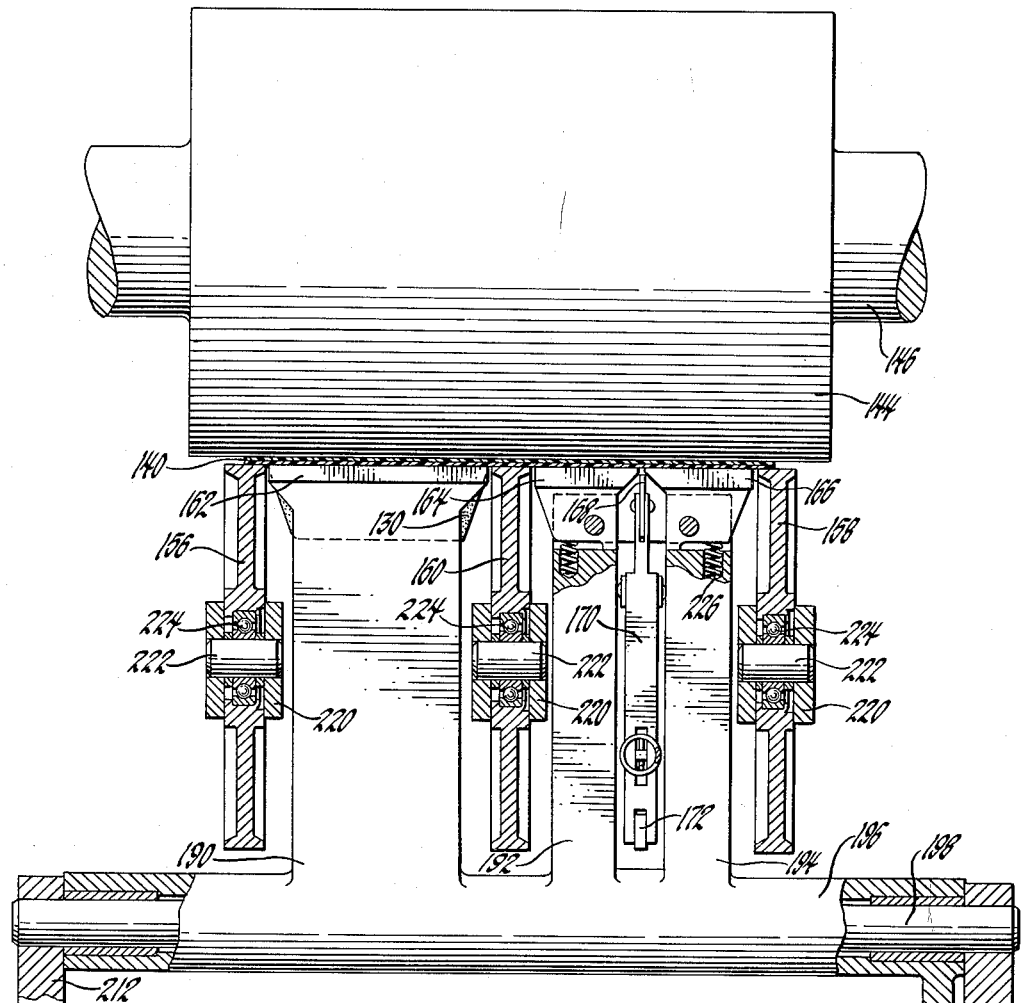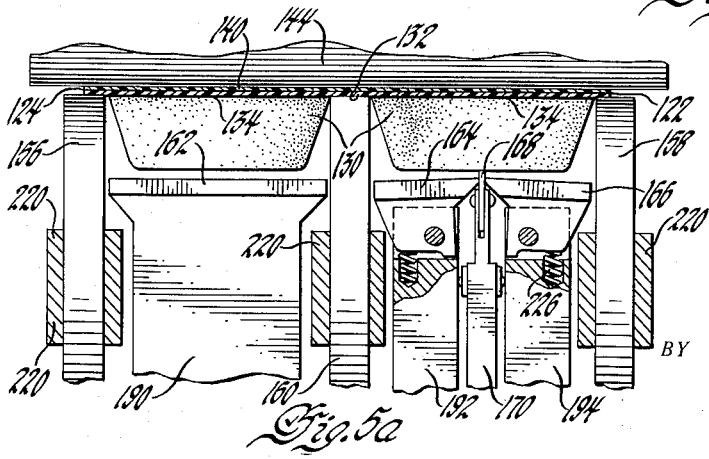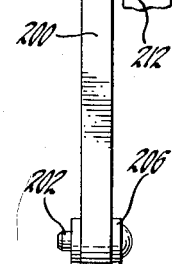

INVENTOR.
Vernon W. Dakin
BY
ATTORNEY

United States Patent Office 2,982,067
Patented May 2, 1961

2,982,067

PACKAGING MACHINE

Vernon W. Dakin, New Lothrop, Mich., assignor to General Motors Corporation, Detroit, Mich., a corporation of Delaware Filed June 23, 1958, Ser. No. 743,823

3 Claims. (Cl. 53—180)

The invention relates to a machine for packaging articles continuously. The materials from which the packaging containers are formed are provided in continuous strips which are formed to provide article-receiving pockets, the articles to be packaged are placed within the pockets, the pockets are sealed to provide strips of filled packages, and the strips are separated to yield individual package units.

The machine preferably uses thermo-plastic materials and vacuum forming operations to accomplish the desired result. The pockets for receiving the articles to be packaged are formed at spaced intervals in a strip of vacuum forming film. This film may be made of cellulose, acetate, butyrate, polyethylene, vinyls or other plastic materials which are adapted to be used in the vacuum forming operations. The strip of pockets is advanced along a track and filled with the articles to be packaged. A covering strip of suitable material which will seal upon contact with the strip of pockets is engaged with the top side of the filled pockets to form the completed containers. The strip of containers is then severed to provide individual packaging units which may consist of one or more of the packages.

The entire machine is operated under timed scheduling of the various stations so that a continuous packaging line is provided.

By using strips of packaging material, storage space for containers is greatly reduced. Since the machine operates as an entity, the entire operation may be handled by a minimum number of persons, their primary function being to keep the machine supplied with the necessary strips and articles to be packaged.

It is preferable to use thermo-plastic materials in order that they may be readily handled at normal room temperatures and easily formed to the desired shapes when heated. They should also retain these shapes when cooled and have sufficient strength to hold articles being packaged therein.

In the drawings:

Figure 5 is a view with parts broken away and in section taken in the direction of arrows 5—5 of Figure 6;

Figure 5a is a view similar to a portion of Figure 5 and shows the sealing mechanism in a retracted position.

Figure 1:
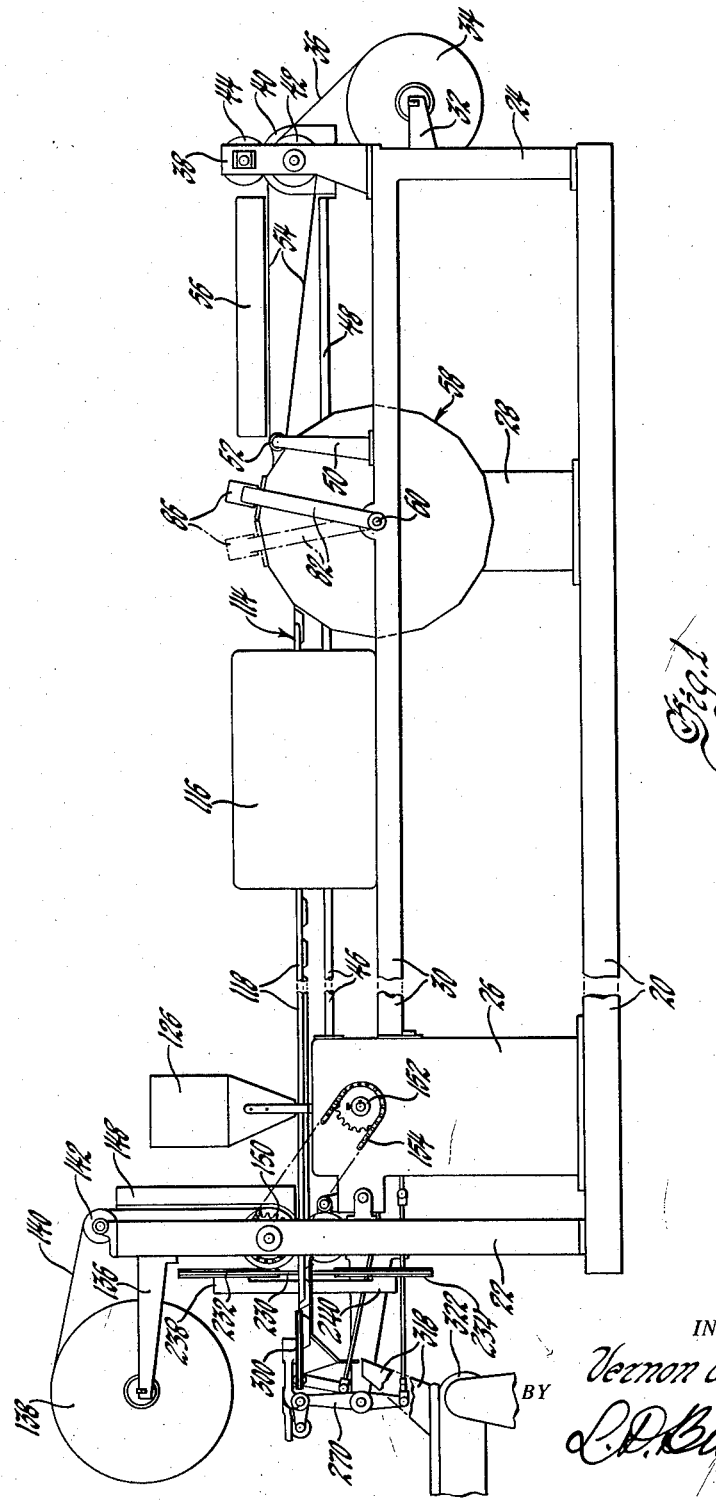
Figure 1 is a view in elevation of an entire machine which embodies the invention.

Referring to Figure 1, the series of operations begins at the right hand end of that figure and terminates at the left hand end thereof. The entire machine is supported on a base 20 with frame members 22 and 24 extending upwardly therefrom at either end to support portions of the machine. Pedestals 26 and 28 are positioned intermediate frame members 22 and 24 and also support portions of the machine. These pedestals are formed to contain portions of the driving and controlling mechanism and may be connected at their upper ends with vertical frame members 22 and 24 by a horizontal frame member 30.

Frame member 24 may be provided with arms 32 on which a strip roll 34 is rotatably supported. This roll is formed of a film strip 36 which is used to provide the main body of the containers being made by the machine. Feed roll supports 38 are positioned on the upper end of frame 24 and have a feed roll gear box 40 supported therebetween with feed rolls 42 and 44 extending transversely of the machine. Feed roll 44 is driven by the gear box 40 and is in effective rolling contact with feed roll 42 to drive that roll. The film strip 36 is in contact with and extends through and between feed rolls 42 and 44 and is positively driven at a predetermined speed by the rotation of these rolls.

Pedestal 26 may contain the necessary power supply for the operation of the entire machine. The power may be furnished by electrical or fluid motors or any other suitable means. This pedestal also contains appropriate gearing to drive the power shafts, etc., to be described. Since the power supply and the gearing involved may be of any suitable type and form no part of the invention, they are not shown in detail. The power feed gear box 40 is driven from the power supply in pedestal 26 through the drive shaft 46 and pedestal 28 to the feed roll drive shaft 48. Shaft 48 may terminate in a worm gear within the gear box 40 which may be connected to drive the feed roll 44.

A stand 50 may be supported on frame member 30 in longitudinal spaced relation to the feed roll supports 38. Stand 50 is preferably provided with a freely rotatable roll 52 about which a continuous belt 54 is passed. This belt is also passed around feed roll 44 and is tensioned sufficiently to be driven thereby. When the film strip 36 passes through the feed rolls 42 and 44, it is supported by belt 54 throughout the distance between rolls 44 and 52. A radiant heater 56 is superimposed above the upper leg of belt 54 on which the film strip rides. This heater heats the strip to the proper temperature so that it may be easily formed to the desired shape in the vacuum forming operation.

As the film strip passes over the end of the belt adjacent roll 52, it is transferred to a rotating forming drum 58. This drum is supported on a shaft 60 which is driven by appropriate gearing contained in pedestal 28 as well as being supported by that pedestal. The drum gearing is provided with power delivered through drive shaft 46. Since the drum 58 and the feed roll gear box 40 are driven through positive gearing and a common shaft, it may be easily seen that they are arranged in timed relation so that the linear speed of the film strip 36 will remain constant.

Figure 2:
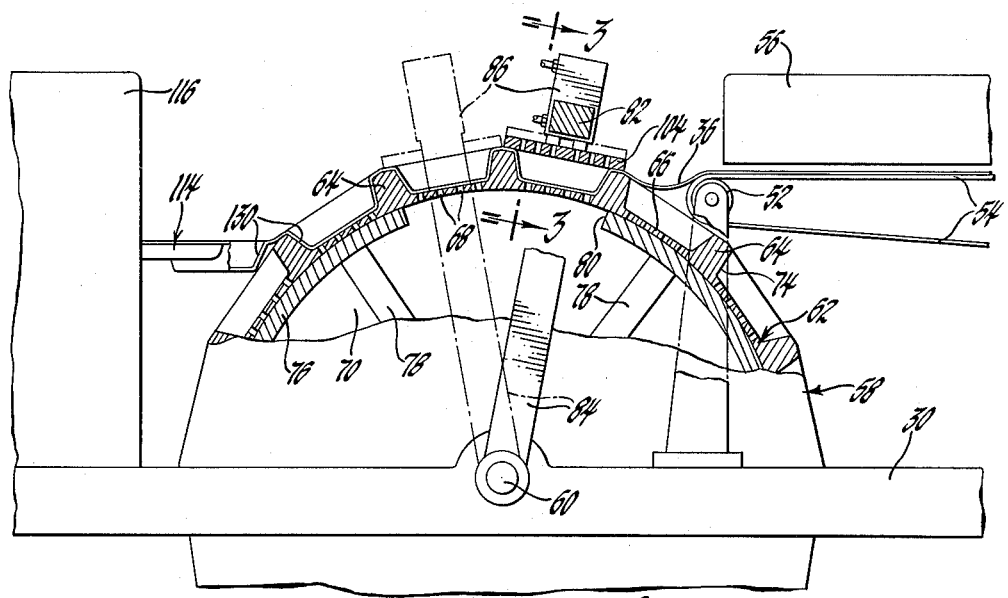
Figure 2 is an elevation view of the vacuum forming mechanism of the machine of Figure 1 with parts broken away and in section.
Figure 3:
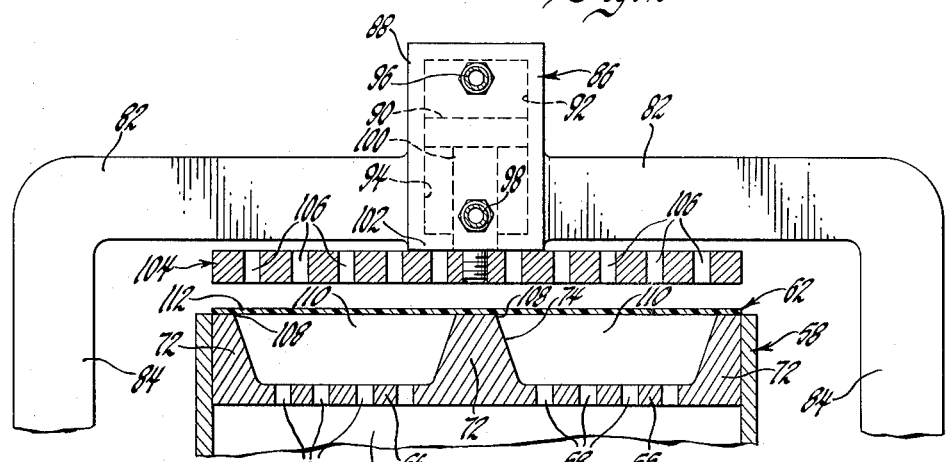
Figure 3 is a view taken in the direction of arrows 3—3 of Figure 2 and having parts broken away and in section.
Figure 3A:
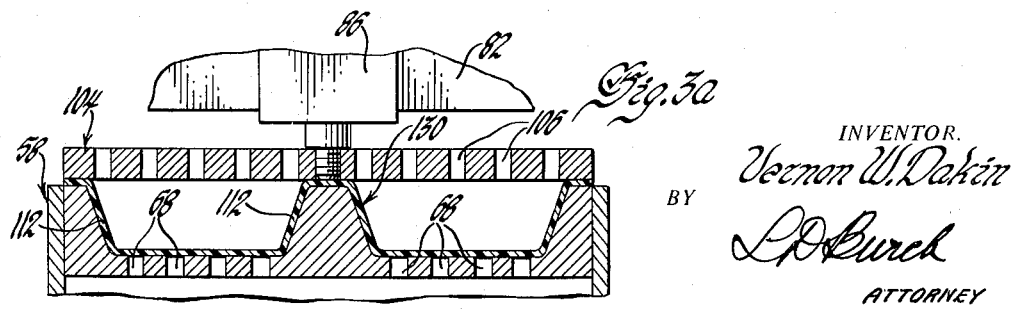
Figure 3a is a view similar to Figure 3 and showing a step in the vacuum forming operation.

The vacuum drum 58 is shown in greater detail in Figures 2, 3, and 3a. The drum is formed with one or more circumferentially extending series of pocket molds 62, the drum being shown in the drawings as having two parallel series of molds. Adjacent pocket molds 62 are separated circumferentially of the drum by transverse walls 64. As seen in Figure 2, the outer periphery of the drum is made up of a series of flat surfaces which are angularly joined at the center of the transverse walls 64. Each pocket mold 62 is formed to extend radially within the drum from the center of a flat surface.

The bottoms 66 of the molds 62 are provided with several vacuum passages 68 which communicate with the interior of drum 58. The interior of this drum defines a vacuum chamber 70 which, during operation of the machine, is held at a pressure sufficiently below atmospheric pressure to maintain the vacuum forming operation. The transverse walls 64 of the pocket molds are connected with longitudinal walls 72 extending circumferentially of the drum. Walls 64 and 72 cooperate to define the side surfaces of molds 62. These walls are preferably slanted as shown at 74 in Figures 2 and 3 to provide sufficient draft for easy forming and removal of the film strip.

Drum 58 is formed on its interior surface as a cylinder and is rotatably supported on inner drum 76. This drum is held stationary and supported by inner drum struts 78. These struts connect with a portion of the pedestal 28 to provide support for the inner drum. The upper side of drum 76 is provided with a transverse access opening 80. As the forming drum 58 rotates on the inner drum 76, one or more of the transverse series of pocket molds 62 will be passed successively across access 80 at which time they will be subjected to the partial vacuum in chamber 70 by means of passages 68.

A clamp yoke 82 extends radially outward of forming drum 58 and transversely across that drum. This yoke is supported by arms 84 on drum shaft 60. The portion of yoke 82 extending transversely across the outer periphery of drum 58 supports a clamp motor 86 which may be of any suitable type, but is shown as being operated by a fluid. The fluid may be air or suitable hydraulic means.

Motor 86 has a cylinder 88 in which piston 90 may be reciprocated. The piston divides cylinder 88 into chambers 92 and 94 to which are respectively connected conduits 96 and 98. These conduits supply fluid for power operation of the motor. The motor may thus be positively actuated to move the piston 90 toward either end of the cylinder 88.

A piston rod 100 is attached to piston 90 and extends through the lower end 102 of the motor housing and has a clamping plate 104 secured to its outer end by any suitable means. This plate may be reciprocated by action of the motor 86. The plate is provided with a plurality of air passages 106. It is also parallel to one of the pocket mold flat outer surfaces and, when reciprocated radially inwardly of the clamp yoke toward the forming drum, will engage the upper surfaces 108 of the longitudinal walls 72 and transverse walls 64. Plate 104 will thus cover an entire pocket mold and will cover all of the pocket molds in a transverse series. The portions of the clamping plate 104 which are in engageable relation with the upper surfaces 108 are not provided with air passages, the passages 106 being in alignment with the chamber 110 of each pocket mold.

The clamp yoke 82 is supported on the arms 84 to pivot about the drum shaft 60. It is arranged to be driven throughout an arc representing a portion of the rotating travel of the forming drum 58 through which the drum passes while the clamping plate 104 is engaged with the drum. Appropriate controls, which may be automatic, permit the actuation of clamp motor 86 to disengage plate 104 from the forming drum and reverse the arcuate movement of yoke 82 so that the clamping plate and motor are returned to a position preparatory to re-engagement with the forming drum at the next adjacent transverse series of pocket molds.

As film strip 36 is fed onto the forming drum 58 from belt 54, it extends across the upper surfaces 108 of the transverse and longitudinal walls as is shown in Figure 3.

The clamp motor 86 is then actuated to lower the clamping plate 104 so that the film strip is held in place intermediate that plate and the forming drum. In the meantime the drum 58 has rotated counterclockwise as seen in Figure 2 so that the air vacuum passages 68 in the bottoms of the pocket molds 62 are clear to the inner drum 76 and connect with the vacuum chamber 70 through access opening 80. Since the clamping plate 104 holds the film strip in place on all of the upper surfaces 108, the portions 112 of the strip are pressed by atmospheric pressure entering air passages 106 into the pocket mold chamber 110. The film strip portions 112 stretch easily to accommodate the deformation necessary since they have been heated by heater 56 to a plastic state. Portions 112 thus take the form of the slanted surfaces 74 and mold bottom 66 to form pockets 130 in the shape of the mold chambers. This operation is clearly shown in Figures 3 and 3a.

The strip of pockets thus formed is led from the forming drum over a track 114 which extends from a point adjacent drum 58, through a refrigerated chamber 116 and to the article feeding and sealing mechanisms to be described. The sealing mechanism is provided with positive drive rollers which are timed in relation to the forming drum 58 and the feed rollers 42 and 44 to provide for constant linear movement of the pocket strip.

The refrigerated chamber 116 has air circulating therethrough which is cooled by any suitable refrigeration means. This air cools the formed pocket strip and causes the strip to more positively remain in the formed configuration. It also prevents the strip and the pockets formed therein from being damaged in further handling by causing the plastic material to assume a more solid state. Track 114 may be comprised of several members such as longitudinal supports 118 and 120 which are suitably secured to stationary portions of the machine. The longitudinal edges 122 and 124 of the strip ride on top of the supports 118 and 120 as the strip moves along the track.

A feed hopper 126 is positioned above the track 114 at a point beyond the refrigerated chamber 116, and is illustrated in the drawings as being above and supported by pedestal 26. This hopper contains the articles 128 to be packaged. Any suitable dispensing means for the articles may be attached to the lower portion of the hopper to guide the articles into the pockets 130 and control their flow. The articles 128 may fill the pockets 130 to the desired extent, it being preferred that they do not fill the pockets beyond the level of the upper surfaces of the strip from which the pockets are formed.

Figure 4:
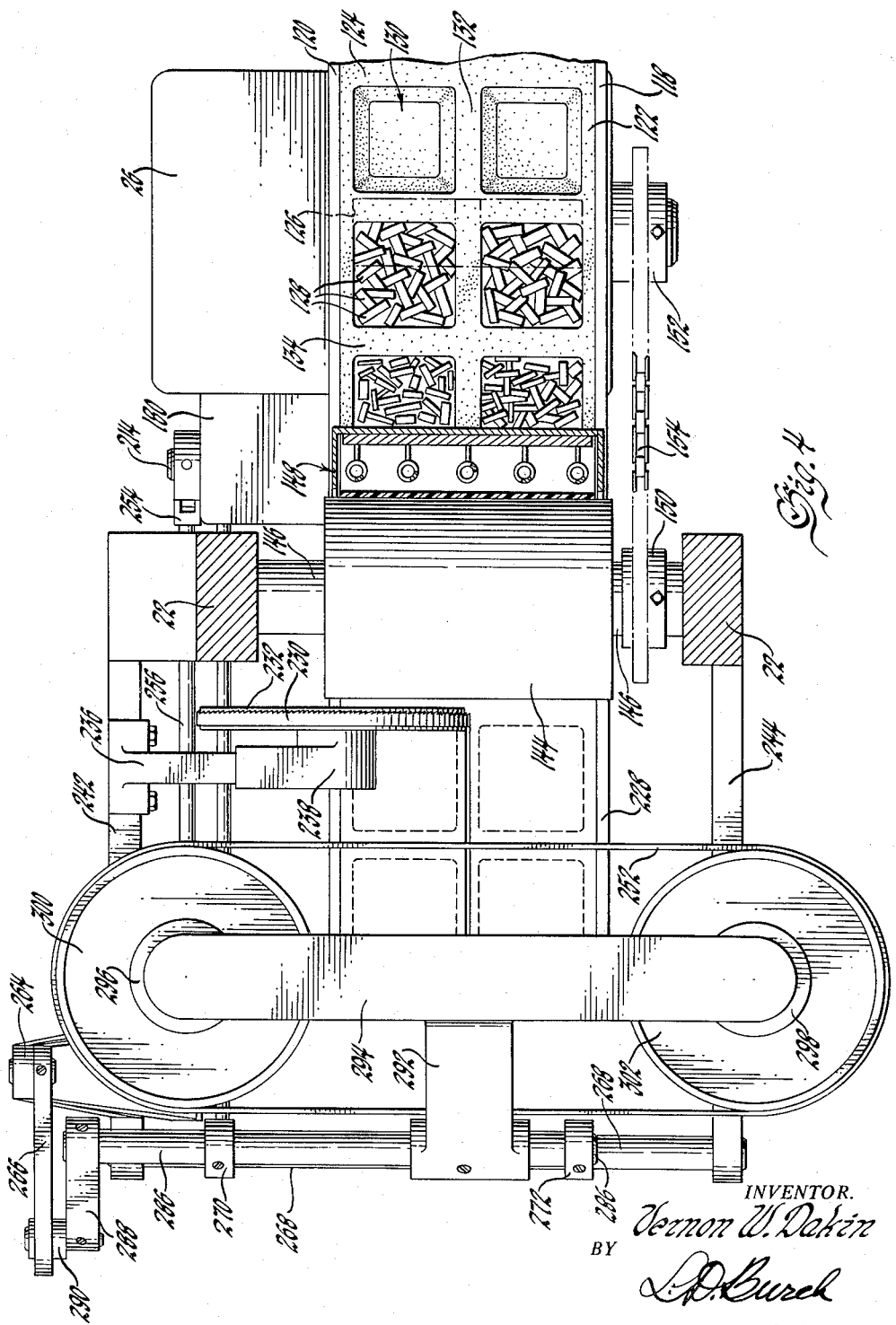
Figure 4 is a view taken in the direction of arrows 4—4 of Figure 6 and having parts broken away and in section.

In the strip of pockets shown in Figure 4, two rows of pockets have been formed with the rows being joined by a center longitudinal edge 132 and adjacent pockets being joined by transverse edges 134. The strip of pockets is advanced beyond the feed hopper with the articles received in the pockets to the sealer mechanism. This mechanism is mounted on the upper portion of frame 22. Arms 136 extend from frame 22 and support covering strip roll 138 in a manner similar to the support of strip roll 34 by arms 32. The covering film strip 140 is led from roll 138 over a guide roll 142 mounted on the upper end of frame 22 and downwardly around sealing roll 144. This roll is mounted on a shaft 146 secured to frame 22 by any suitable means. The strip of pockets is led underneath roll 144 for the sealing operation.

Film strip 140 passes a radiant heater 148 which is positioned intermediate guide roll 142 and sealing roll 144. The film strip 140 is heated so that it will seal the pockets 130 when it engages the pocket strip along longitudinal edges 122 and 132 and transverse edges 134 and pressure is applied. Sealing roll 144 is provided with a drive sprocket 150. Another drive sprocket 152 extends from pedestal 26 and is driven by suitable mechanism contained therein. A drive chain or other flexible link 154 engages sprockets 150 and 152 to drive the sealing roll 144 so that the linear speed of its roll surface is equal to the linear speed of the pocket strip throughout the machine. As sealing roll 144 rotates and the strip of filled pockets passes underneath, film strip 140 is placed on top of the pocket strip and engages that strip. Each of the sealing disks 156 and 158 engage the underside of longitudinal edges 122 and 124 of the strip of pockets and press the pocket strip and the sealing film strip together against sealing roll 144. Since the sealing film strip has been heated, it readily seals along the longitudinal edges. A center sealing disk 160 similarly engages and seals the films together along edge 132.

The transverse edges 134 intermediate the pockets 130 are sealed by transverse sealing feet 162, 164, and 166. These feet are moved upwardly intermediate the pockets to engage the underside of the transverse edges so that sealing film strip 140 is sealed against the transverse edges 134. Feet 164 and 166 may be considered to be a single sealing foot similar to foot 162, with a space receiving a follower to be described. The strip of pockets now has the article sealed in individual pocket units.

The transverse sealing feet are controlled by a follower roll 168 which is mounted on a follower arm 170. Arm 170 is pivotally attached to lever 172 and extends upwardly therefrom so that follower roll 168 will normally engage the under surface of each of the pockets 130 in one of the rows of pockets formed in the pocket strip. Thus the pockets themselves are used as control cams for actuating the transverse sealing feet. The upper portion of follower arm 170 has a guide rod 174 pivotally attached underneath follower roll 168 and extending generally parallel to lever 172 to a pivot 176. This pivot and rod, together with lever 172 and its support shaft 178, give a parallelogram effect to the movement of follower arm 170. Shaft 178 is supported by cam housing 180 which extends from the main body of pedestal 26. Pivot 176 is formed on the end of a projection 182 which extends from the main body of pedestal 26. A lug 184 may be formed on cam housing 180. Tension spring 186 is secured to lug 184 at one end and to a pin 188 in follower arm 170. The force of spring 186 holds follower roll 168 against the undersurface of the series of pockets.

Figure 6:
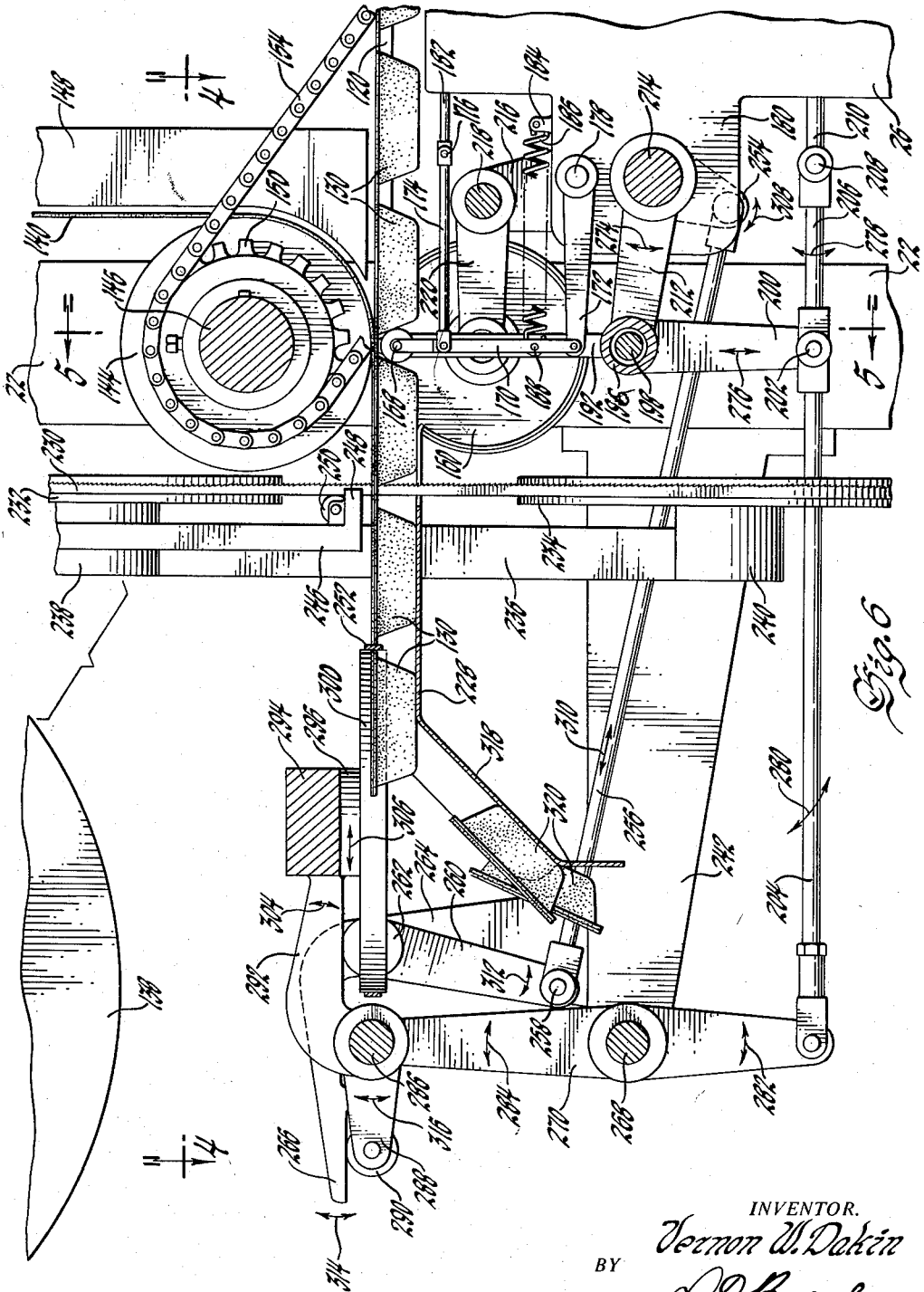
Figure 6 is an enlargement of the portion of the machine of Figure 1 showing the sealing and severing mechanism and method, and having parts broken away and in section.

As the strip of pocket passes underneath the sealing roll 144, the follower roll 168 extends upwardly intermediate adjacent pockets as is shown in Figure 6 and is moved downwardly as the pocket progresses since it follows the bottom outline of the pocket. As the pocket passes beyond roll 168, this roll again moves upwardly along with follower arm 170 and lever 172. The reciprocated motion of the follower mechanism is transmitted to shaft 178.

Transverse sealing foot 162 is provided with an arm 190 and transverse sealing feet 164 and 166 are provided with arms 192 and 194, respectively. These arms are secured to or integrally formed as radial extensions of a cylinder 196 which is mounted on shaft 198 in suitable bearings. Lever 200 is secured to cylinder 196 adjacent one end thereof and extends downwardly in a direction opposite the transverse sealer arms. The lower end of lever 200 is provided with a pivot 202 to which a lever control rod 204 is secured. Another rod 206 is also pivoted at this point and extends toward pedestal 26 where it is attached by pivot 208 to a projection 210 extending from and secured to pedestal 26.

The outer ends of shaft 198 have control levers 212 attached thereto and extending toward either side of cam housing 180. Control levers 212 have their ends adjacent cam housing 180 secured to a shaft 214 so that they may arcuately reciprocate with that shaft.

Cam housing 180 is also provided with lugs 216 which support shaft 218 and sealing disk support arms 220. As is best shown in Figure 5, three such arms 220 are provided. These arms are bifurcated to receive the sealing disks. Each arm 220 is provided with a shaft 222 on which a bearing 224 is mounted to receive one of the seal disks.

Cam housing 180 is provided with any suitable cam mechanism which is responsive to arcuately reciprocating movement of lever 172 to move control levers 212 in a similar motion to provide the vertical stroke required of transverse sealing feet 162, 164, and 166. The links are preferably such that the sealing feet extend fully into the areas intermediate adjacent pockets and firmly engage the underside of sealing strip transverse edges 134 to provide the desired sealing action. The transverse sealing feet may be pivotally secured to their associated arms and urged upwardly by suitable compression springs 226 if desired in order to eliminate unnecessary shocks and assure full engagement of the feet.

The sealed pocket strip passes beyond the sealing roll and is supported underneath by a slide 228. The leading edge of this slide is split to receive vertical band saw blade 230 which is positioned so as to sever the strip of pockets along the center of longitudinal edge 132 as the strip moves onto the slide. Thus the single strip of pockets is now formed into a series of pocket strips. Should more than two strips of pockets be formed at any one time, additional saw blades may be provided in proper alignment as desired to sever the pockets into single strips.

The vertical band saw blade 230 is supported on saw blade pulleys 232 and 234. These pulleys are positioned respectively above and below slide 228 and mounted on pulley frame 236 in bearing housings 238 and 240. Frame 236 is suitably secured to arm 242 which extends from one side of frame 22. A similar arm 244 is also provided on the other side of frame 22 and these arms provide supports for a pivot shaft to be described. A band saw guide 246 may extend from frame 236 as is best seen in Figure 6. Guide 246 terminates in an arm 248 which has its outer end split to receive the saw blade 230 immediately above the point of engagement of the blade with the pocket strip. A blade guide roller 250 may be mounted on the guide 246 and arm 248 so as to engage the back edge of blade 230 and aid in holding the blade in place with a minimum of friction. One of the band saw pulleys may be driven by any suitable means not shown in order to provide power for the band saw.

The next operation performed by the machine is that of severing the series of pockets transversely to divide the strips into individual packaged units. This is accomplished by providing a horizontal band saw 252 which is intermittently brought into engagement with the pocket strips in the center of the transverse edges 134 so as to sever the strips into the packaging units desired. Since the strip of pockets is moving at a continuous rate, the horizontal band saw must also be moved at the same rate for the short interval of time in which it is severing the strips. These actions are accomplished and controlled by linkage associated with the cam mechanism in cam housing 180 which is in turn controlled by the movements of roll follower 168.

Shaft 214, the arcuate reciprocating movement of which is controlled by the mechanism in housing 180, has a lever 254 attached thereto on the opposite end from control lever 212. Lever 254 extends downwardly relative to lever 212 and has cam control rod 256 pivotally attached thereto for axial reciprocating motion when shaft 214 and lever 254 are moved arcuately. The other end of control rod 256 has a pivot 258 which is attached to one end of a bell crank 260. This crank is pivoted on a cam pivot shaft 262 which is in turn supported by pivot shaft support 264 extending upwardly from the outer end of arm 242. The end of bell crank 260 opposite pivot 258 is formed as a cam 266 which is caused to pivot about shaft 262 through the linkage just described.

Arms 242 and 244 have a pivot lever support shaft 268 extending between the outer ends thereof and received in suitable bearings for rotating movement. Pivot levers 270 and 272 are secured to or mounted for rotation on shaft 268 in spaced relation as is best shown in Figures 4 and 6. Pivot levers 270 and 272 receive shaft 268 through an intermediate portion thereof. Pivot lever control rod 204 is pivotally attached to the lower end of lever 270. When control lever 212 is reciprocated under the control of follower 168 as shown by arrow 274, lever 200 is moved in the directions indicated by arrow 276, thereby reciprocating rod 206 as indicated by arrow 278. This imparts movement to the pilot lever control rod in the directions shown by arrow 280, thereby causing pivot lever 270 to move about shaft 268 as shown by arrows 282 and 284.

The upper ends of pivot levers 270 and 272 have pivot shaft 286 mounted therein. One end of shaft 286 is provided with a cam follower arm 288 on which a cam follower 290 is mounted. This follower is preferably of the roller type and engages the lower surface of cam 266. Gooseneck support 292 is secured to shaft 286 for rotation therewith as is arm 288. The other end of support 292 has pulley frame 294 secured thereto. The ends of this frame are provided with bearing housings 296 and 298 on which pulleys 300 and 302 are mounted for rotation. Horizontal band saw 252 passes around pulleys 300 and 302 and may be driven by any suitable means not shown for driving one of these pulleys.

The camming action of the mechanism is so timed that gooseneck support 292 will pivot downwardly as indicated by arrow 304 so as to engage horizontal band saw 252 with the pocket strip intermediate adjacent pockets and sever the strip substantially in the center of a transverse edge 134. At the same time the horizontal band saw is moved to the left as is shown in Figure 6 at the linear speed maintained by the pocket strips. This motion is indicated by arrow 306 and is obtained by the downward movement of lever 212, lever 200, and rod 204 which causes pivot lever 270 to pivot about shaft 268, moving pivot shaft 286 to the left as seen in Figure 6. This motion is obtained when roll follower 168 moves downwardly by reason of engagement with the leading side of one of the pockets. When follower 168 engages the trailing side of one of the pockets, the motion is reversed and band saw 252 is moved upwardly as shown by arrow 304. The saw is also moved to the right after disengaging the pocket strips so as to be in position to sever the next set of pockets. The upward and downward movement of the saw 252 is obtained through movement of lever 254 in the directions of arrow 308 and movement of cam controlled rod 256 in the directions of arrow 310, resulting in pivoting action of bell crank 260 and cam 266 as indicated by arrows 312 and 314, respectively. Cam 266 acts on cam follower 290 to move cam follower arm 288 as indicated by arrow 316, thus causing the desired movement of the band saw.

When the package units are severed as described above, the individual containers 320 slide down chute 318 and onto a conveyor 322 which removes them from the machine. Chute 318 may be formed as an extension of slide 228 for this purpose.

The invention thus provides a machine for continually packaging articles by which the packaging containers are formed as a continuous operation, the packages are filled and sealed, separated into individual package units and removed. The machine embodying the invention permits automatic operation and provides minimum storage problems for containers prior to use. The containers formed are attractive and advantageous in that, when transparent materials are used, the packaged articles may be clearly seen by the purchaser or user and identified without destroying the package.

What is claimed is:

1. Sealing mechanism for sealing a cover over a continuous strip of article-containing pockets having a plurality of longitudinal rows of article-containing pockets formed therefrom, said mechanism comprising a sealing roll operatively contacting the upper surface of the continuous strip and extending transversely over the entire width thereof, a plurality of transversely spaced sealing discs engaging the lower surface of the continuous strip and cooperating with said sealing roll to seal the strip cover to the strip longitudinally and on either side of each of the longitudinal rows of article-containing pockets, transversely extending vertically disposed sealing feet for intermittently cooperating with said sealing roll to seal the strip cover to the strip transversely of the strip and intermediate successive pockets, at least one of said sealing feet having a space and receiving a follower roll therein, said follower roll engaging the lower surface of a longitudinal row of pockets and actuated thereby to control the intermittent cooperation of said sealing feet with said sealing roll, and control linkage interconnecting said cam follower and said sealing feet for actuating said sealing feet in accordance with said follower roll control.

2. In a machine for sealing a continuous strip of article containing pockets and severing said strip into individual pocket units, first means for continuously sealing said strip of pockets longitudinally, second means for intermittently sealing said strip of pockets transversely intermediate said pockets, third means for continuously severing said strip of sealed pockets longitudinally to form a plurality of strips of sealed pockets, fourth means for severing each of said plurality of strips of sealed pockets transversely intermediate said pockets to form individual pocket units, and control mechanism for said second means and said fourth means, said control mechanism comprising actuating linkages and cam controlled linkage for said actuating linkages, said cam control linkage including a cam follower contacting the lower surface of said continuous strip, the longitudinal profile of said continuous strip of pockets acting as a cam for said cam follower.

3. In a packaging machine for packaging articles in a strip series of preformed pockets, means for sealing said pockets when filled by the articles being packaged, and cam controlled severing mechanism for severing said strip series of sealed pockets into individual packaged units, said mechanism comprising intermittently acting transverse severing means and continuously acting longitudinal severing means and cam controlled timing linkage controlling the intermittent action of said transverse severing means.

References Cited in the file of this patent

UNITED STATES PATENTS

| | | |
|---|---|---|
| 2,229,613 | Strauch | Jan. 21, 1941 |
| 2,546,059 | Cloud | Mar. 20, 1951 |
| 2,663,128 | Stirn | Dec. 22, 1953 |
| 2,730,852 | Clark | Jan. 17, 1956 |
| 2,736,150 | Loew | Feb. 28, 1956 |